United States Patent
Tseng

(10) Patent No.: US 10,470,107 B2
(45) Date of Patent: Nov. 5, 2019

(54) COMMUNICATION DEVICES AND METHOD OF CONTROLLING DISCOVERY SIGNAL COMMUNICATION

(71) Applicant: Industrial Technology Research Institute, Chutung, Hsinchu (TW)

(72) Inventor: Yung-Lan Tseng, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 180 days.

(21) Appl. No.: 14/939,740

(22) Filed: Nov. 12, 2015

(65) Prior Publication Data
US 2016/0142968 A1  May 19, 2016

Related U.S. Application Data

(60) Provisional application No. 62/079,570, filed on Nov. 14, 2014.

(51) Int. Cl.
| | |
|---|---|
| *H04W 48/16* | (2009.01) |
| *H04W 8/00* | (2009.01) |
| *H04L 5/00* | (2006.01) |
| *H04W 40/24* | (2009.01) |
| *H04W 88/02* | (2009.01) |

(52) U.S. Cl.
CPC ............ *H04W 48/16* (2013.01); *H04L 5/005* (2013.01); *H04W 8/005* (2013.01); *H04L 5/001* (2013.01); *H04W 40/246* (2013.01); *H04W 88/02* (2013.01)

(58) Field of Classification Search
CPC .... H04L 43/16; H04L 5/0098; H04W 40/246; H04W 48/16; H04W 88/02; H04W 8/005
See application file for complete search history.

(56) References Cited

U.S. PATENT DOCUMENTS

| | | |
|---|---|---|
| 8,559,950 B2 | 10/2013 | Choi et al. |
| 8,817,623 B2 | 8/2014 | Gupta et al. |
| 8,861,452 B2 | 10/2014 | Barbieri et al. |

(Continued)

FOREIGN PATENT DOCUMENTS

| | | |
|---|---|---|
| CN | 103002578 A | 3/2013 |
| CN | 103096383 A | 5/2013 |

(Continued)

OTHER PUBLICATIONS

Feng, "Device-to-Device Communications in LTE-Advanced Network. Networking and Internet Architecture", Telecom Bretagne, Universite de Bretagne-Sud, 2013, pp. 1-155.

(Continued)

*Primary Examiner* — Jeffrey M Rutkowski
*Assistant Examiner* — Chae S Lee
(74) *Attorney, Agent, or Firm* — Birch, Stewart, Kolasch & Birch, LLP

(57) ABSTRACT

A method of controlling discovery signal communication of a user equipment (UE) and a UE using the same is disclosed. The method comprises steps of selecting a target operating radio resource associated with the discovery signal communication among a plurality of discovery radio resources to transmit at least one discovery signal of the UE, and updating the target operating radio resource by the UE based on a loading of the plurality of discovery radio resources calculated by the UE.

52 Claims, 15 Drawing Sheets

(56) References Cited

U.S. PATENT DOCUMENTS

| | | | |
|---|---|---|---|
| 8,995,370 B2 | 3/2015 | Pelletier et al. | |
| 2013/0059583 A1 | 3/2013 | Van Phan et al. | |
| 2014/0094162 A1* | 4/2014 | Heo | H04W 4/70 455/422.1 |
| 2014/0094183 A1 | 4/2014 | Gao et al. | |
| 2014/0112194 A1 | 4/2014 | Novlan et al. | |
| 2014/0219261 A1 | 8/2014 | Johnsson | |
| 2015/0009910 A1 | 1/2015 | Ryu et al. | |
| 2015/0043448 A1* | 2/2015 | Chatterjee | H04W 8/005 370/329 |
| 2015/0215903 A1* | 7/2015 | Zhao | H04W 72/04 370/329 |
| 2015/0245193 A1* | 8/2015 | Xiong | H04W 4/80 370/328 |
| 2016/0183167 A1* | 6/2016 | Agiwal | H04W 72/042 370/329 |

FOREIGN PATENT DOCUMENTS

| | | |
|---|---|---|
| CN | 103313309 A | 9/2013 |
| CN | 103843444 A | 6/2014 |
| CN | 103891381 A | 6/2014 |
| CN | 103997727 A | 8/2014 |
| CN | 103997788 A | 8/2014 |
| CN | 104066200 A | 9/2014 |
| CN | 104105083 A | 10/2014 |
| TW | 201603623 A | 1/2016 |
| WO | WO 2013/171114 A1 | 11/2013 |
| WO | WO 2014/113537 A1 | 7/2014 |
| WO | WO 2014/148859 A1 | 9/2014 |
| WO | WO 2014/154256 A1 | 10/2014 |

OTHER PUBLICATIONS

Gao et al., "Radio resource management of D2D communication", Proceedings of the 2014 IEEE ICCS, 2014, pp. 6-10.

Lu et al., "Application-Aware Opportunistic D2D Link Schedulers: Traffic Offloading and User Perceived QoS", http://users.ece.utexas.edu/~gustavo/papers/LuD14.pdf, 2014, pp. 1-14.

Mumtaz et al., "Energy Efficient Interference-Aware Resource Allocation in LTE-D2D Communication", IEEE ICC 2014—Ad-hoc and Sensor Networking Symposium, pp. 282-287.

Tiirola et al., "On the Design of Discovery Patterns for Half-Duplex TDD Nodes Operating in Frame-Based Systems", Future Network and MobileSummit 2013 Conference Proceedings, www.FutureNetworkSummit.eu/2013, 2013, pp. 1-9.

Xu et al., "Resource Management for Device-to-Device Underlay Communication", http://arxiv.org/abs/1311.1018v1, Nov. 5, 2013, pp. 1-84.

3GPP Technical Report, "3rd Generation Partnership Project; Technical Specification Group Radio Access Network; Study on LTE Device to Device Proximity Services; Radio Aspects (Release 12)," 3GPP TR 36.843, V12.0.1, Mar. 2014, 14 pages total.

* cited by examiner

| S#1 | Low Priority CC --> High Priority CC | | High Priority CC --> Low Priority CC | |
|---|---|---|---|---|
| | $H_{L\_H}$ | $R_{L\_H}$ | $H_{H\_L}$ | $R_{H\_L}$ |
| High Priority $U_1$ | $H_{L\_H}(U_1) \leq H_{L\_H}(U_2)$ | n.a. | $H_{H\_L}(U_1) > H_{H\_L}(U_2)$ | n.a. |
| Low Priority $U_2$ | | | | |

| S#2 | Low Priority CC --> High Priority CC | | High Priority CC --> Low Priority CC | |
|---|---|---|---|---|
| | $H_{L\_H}$ | $R_{L\_H}$ | $H_{H\_L}$ | $R_{H\_L}$ |
| High Priority $U_1$ | n.a. | $R_{L\_H}(U_1) \leq R_{L\_H}(U_2)$ | n.a. | $R_{H\_L}(U_1) > R_{H\_L}(U_2)$ |
| Low Priority $U_2$ | | | | |

| S#3 | Low Priority CC --> High Priority CC | | High Priority CC --> Low Priority CC | |
|---|---|---|---|---|
| | $H_{L\_H}$ | $R_{L\_H}$ | $H_{H\_L}$ | $R_{H\_L}$ |
| High Priority $U_1$ | $H_{L\_H}(U_1) \leq H_{L\_H}(U_2)$ | $R_{L\_H}(U_1) \leq R_{L\_H}(U_2)$ | $H_{H\_L}(U_1) > H_{H\_L}(U_2)$ | $R_{H\_L}(U_1) > R_{H\_L}(U_2)$ |
| Low Priority $U_2$ | | | | |

FIG. 9 ered and the accompanying drawings given by way of illustration only, and thus are not limitative of the limits of the present invention.

COMMUNICATION DEVICES AND METHOD OF CONTROLLING DISCOVERY SIGNAL COMMUNICATION

CROSS-REFERENCE TO RELATED APPLICATION

This nonprovisional application claims priority under 35 U.S.C. § 119(e) of a U.S. Provisional Application No. 62/079,570 filed on Nov. 14, 2014, the entirety of which is incorporated herein by reference.

TECHNICAL FIELD

The technical field is related to communication devices and method of controlling discovery signal communication.

BACKGROUND OF THE INVENTION

A purpose of direct discovery is to enable one device to discover neighbor devices by receiving discovery signals broadcasted from these neighbor devices directly. A commercial example of direct discovery is a commercial store broadcasting advertisements to customers by delivering discovery signals. Generally, the entity which broadcasts discovery signals is called Tx DUE (Transmitter Discovery User Equipment) and the entity which receives discovery signals is called Rx DUE (Receiver Discovery User Equipment). A device may be a Tx DUE, an Rx DUE, or it may also play both of the roles. Because the purpose of direct discovery is to enable user to obtain the local information around the DUE, Tx DUE would radiate low transmission power to deliver discovery signals. In some of the implementation, Tx DUE may deliver discovery signal with ~20 dBm radiation power.

Take the direct discovery service based on the 3GPP's agreement as an example. A so-called master base station (MBS), or an extended Node B (eNB) in 3GPP specifications, for example, could be a macro base station, or a master micro base station, etc. As shown in FIG. 1, a macro BS provides radio resource for in-coverage DUE to implement direct discovery service and configures radio resource for in-coverage devices to broadcast discovery signals.

The configuration may be a pre-stored list in the memory device or USIM (Universal Subscriber Identity Module) of the DUE. Currently, there are two resource allocation approaches, contention-free and contention-based resource allocations, that are provided to discovery service. The contention-based resource allocation may assist to both MBS and devices: 1) Because of low radiation power used in direct discovery, it is possible that different Tx DUEs may share the same resource blocks to deliver their discovery signals. 2) Contention-based resource allocation enables Tx DUE to stay in the idle state, which could save the battery life time and hardware computations of Tx DUE. 3) Cellular network does not need to keep the UE information about those Tx DUEs, which would reduce the burden of cellular networks, especially when the number of Tx DUEs is large.

As shown in FIG. 1, a sub-frame may be the minimum time unit for MBS to decide whether to allocate D2D (device-to-device) radio resource(s) or not in each sub-frame. DUE may also be configured with a list of direct discovery frequencies which provides direct discovery radio resource pool. MBS may configure radio resources of one or more than one component carriers. In each component carrier, the MBS could allocate communication radio resource pools, e.g., discovery radio resource pool, scheduling assignment message pool, data resource pool, etc., in each sub-frame dynamically or semi-persistently. The resource pool is a block of radio resource which is a time period in the time domain and one or more than one frequency subcarriers in the frequency domain.

After receiving the configuration of direct discovery radio resource pool from the MBS, Tx DUEs may transmit discovery signals on a randomly selected resource block, which is a subset of discovery radio resource pool. Rx DUE would also monitor these configured radio resource pool to obtain discovery signals. The tradeoff between power consumption and processing time of radio resource management of the DUE is often a design consideration.

SUMMARY OF THE INVENTION

Exemplary embodiments in accordance with the application provide user equipment and method of controlling discovery signal communication.

An exemplary embodiment provides a method of controlling discovery signal communication of a user equipment (UE). The method of controlling discovery signal communication of the UE includes steps of selecting a target operating radio resource associated with the discovery signal communication among a plurality of discovery radio resources to transmit at least one discovery signal of the UE, and updating the target operating radio resource by the UE based on a loading of the plurality of discovery radio resources calculated by the UE.

Another exemplary embodiment provides a user equipment (UE) of controlling discovery signal communication. The UE of controlling discovery signal communication includes a processor, operatively coupled to a transmitter, configured to select a target operating radio resource associated with the discovery signal communication among a plurality of discovery radio resources to transmit by the transmitter at least one discovery signal of the UE, and update the target operating radio resource based on a loading of the plurality of discovery radio resources calculated by the processor.

An exemplary embodiment provides a method of controlling discovery signal communication of a user equipment (UE). The method of controlling discovery signal communication of the UE includes steps of monitoring one of a plurality of discovery radio resources associated with the discovery signal communication, for the UE to receive at least one discovery signal transmitting from one or more other user equipments, and determining a Rx-triggering period of the monitored discovery radio resource to receive the at least one discovery signal from the monitored discovery radio resource, based on a loading of the monitored discovery radio resource calculated by the UE.

Another exemplary embodiment provides a user equipment (UE) of controlling discovery signal communication. The UE of controlling discovery signal communication includes a processor, operatively coupled to a receiver, configured to monitor one of a plurality of discovery radio resources associated with the discovery signal communication, for the receiver to receive at least one discovery signal transmitting from one or more other user equipments, and determine a Rx-triggering period of the monitored discovery radio resource to receive the at least one discovery signal from the monitored discovery radio resource, based on a loading of the monitored discovery radio resource calculated by the processor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings are included as exemplary embodiments to provide a further understanding of the disclosure, and are incorporated in and constituted a part of this specification. The drawings show exemplary embodiments of the application and, together with the description, serve to explain the principles of the application.

FIGS. 3, 3A and 3B show an operating radio resource selecting process described in FIG. 2 in accordance with exemplary embodiments;

FIG. 9 shows rules for configuring the hysteresis monitor duration in accordance with exemplary embodiments;

DETAILED DESCRIPTION OF THE EXEMPLARY EMBODIMENTS

Figure 1:
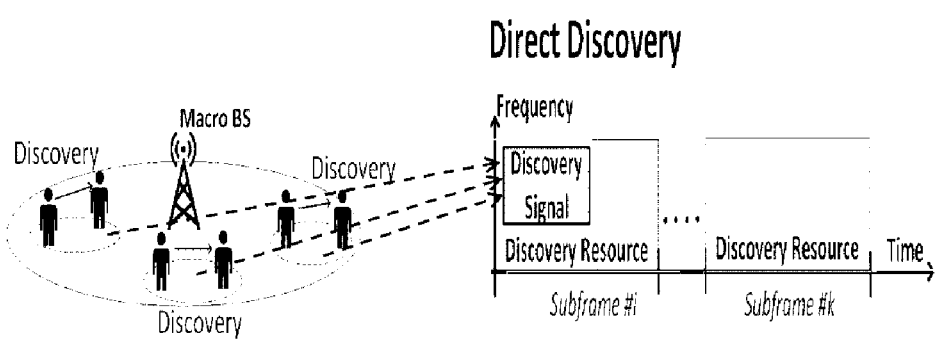
FIG. 1 shows a conceptual graph of a MBS providing radio resource for in-coverage DUE to implement direct discovery service.

The present invention will now be described in detail with reference to the accompanying drawings, wherein the same reference numerals will be used to identify the same or similar elements throughout the several views. It should be noted that the drawings should be viewed in the direction of orientation of the reference numerals.

The disclosure will demonstrate the exemplary embodiments of user equipment and method of controlling discovery signal communication. Some of the embodiments are based on the 3GPP's agreement on ProSe D2D service (Proximity Device-to-Device Service), for demonstration purpose only. However, the disclosed embodiments could also be applied to other point to point communication scenario such as such as Wi-Fi direct and Tunneled Direct Link Setup (TDLS) system and are not limited to the ProSe D2D service.

The loading of discovery radio resource pools may vary with the DUE's locations. When a discovery user equipment (DUE) is monitoring the discovery radio resource pool, it may detect the signal energy on the resource block(s) of the resource pool and decode the resource block(s). Based on the decoding progress, DUE may estimate the loading of discovery radio resource pool by calculating the loading of discovery radio resource pool, by calculating the ratio between the number of occupied resource blocks and the total number of resource blocks on the discovery radio resource pool during an observation period.

MBS may operate on multiple frequencies (Freq#i) and provide one component carrier (CC#j) on each frequency respectively. MBS may configure radio resources of one or more than one component carrier and assign discovery radio resource pool on each CC respectively. DUE may obtain the system information on the CC to obtain the configuration of discovery radio resource. The discovery radio resource pool is a block of radio resource which is a time period in the time domain and one or more than one frequency subcarriers in the frequency domain. The discovery radio resource pool may be further divided into multiple resource blocks, each of which occupies the same number of time unit and frequency carriers.

In some embodiments, Rx DUE may monitor the discovery radio resource of multiple frequencies, MBS may allocate discovery radio resource on each CC. MBS may provide the frequency list to Rx DUEs through broadcasting or dedicated signaling. Rx DUE may decide the monitoring frequency based on the given frequency list. Inter-frequency direct discovery may provide flexibility to MBS and Tx DUE because of the available discovery radio resource. Tx DUE has flexibility to broadcast discovery signal by selecting one CC which can provide available discovery radio resource pool. Tx DUE may decide to broadcast discovery signal on the direct discovery radio resource provided by CC#k. Herein, the Tx DUE is called "camped" on CC#k to deliver discovery signal. Furthermore, Rx DUE may switch between multiple frequencies to obtain the discovery signals delivering on different CCs. The MBS may provide prioritization to different CCs so that Tx DUE/Rx DUE may decide their behavior based on the given frequency prioritization.

In some other embodiments, the MBS may map CC#m to one discovery radio resource pool, $D_r\#m$, m=1N. MBS may provide a list of discovery resource pools to DUEs. All of the discovery resource pools are operating on one CC. Every $D_r\#m$ may have individual and independent configuration. $D_r\#m$ may be configured as continuous radio resource pools which are scheduled regularly by the MBS. Therefore, MBS may also provide resource priority to different discovery radio resource pools by arranging the sequence that $D_r\#m$ appears in the discovery radio resource list. It is possible that DUE knows the priority of $D_r\#m$ based on the amount of resource blocks which are provided in $D_r\#m$. For example, $D_r\#i$ may have higher priority than $D_r\#j$ because it provides more radio resources for Tx DUE to deliver discovery signals.

Figure 2:
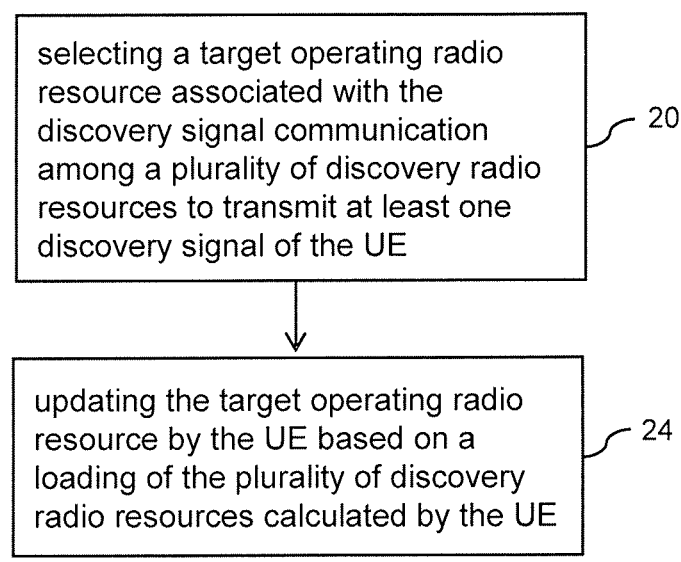
FIG. 2 shows a process of controlling discovery signal communication of a user equipment (UE) to transmit discovery signal(s) in accordance with an exemplary embodiment.

FIG. 2 discloses a method of controlling discovery signal communication of a user equipment (UE) to transmit discovery signal(s) in an exemplary embodiment. As shown in FIG. 2, in an initialization stage (step 20), a target operating radio resource associated with the discovery signal communication is selected among a plurality of discovery radio resources to transmit at least one discovery signal of the UE. And in a radio resource update stage (step 24), the target operating radio resource is updated by the UE based on a loading of the plurality of discovery radio resources calculating by the UE. In some embodiments, the plurality of discovery radio resources are a plurality of component carriers (CCs) respectively on a plurality of frequencies, or a plurality of time-frequency radio resource pools of one of the plurality of CCs.

Figure 3:
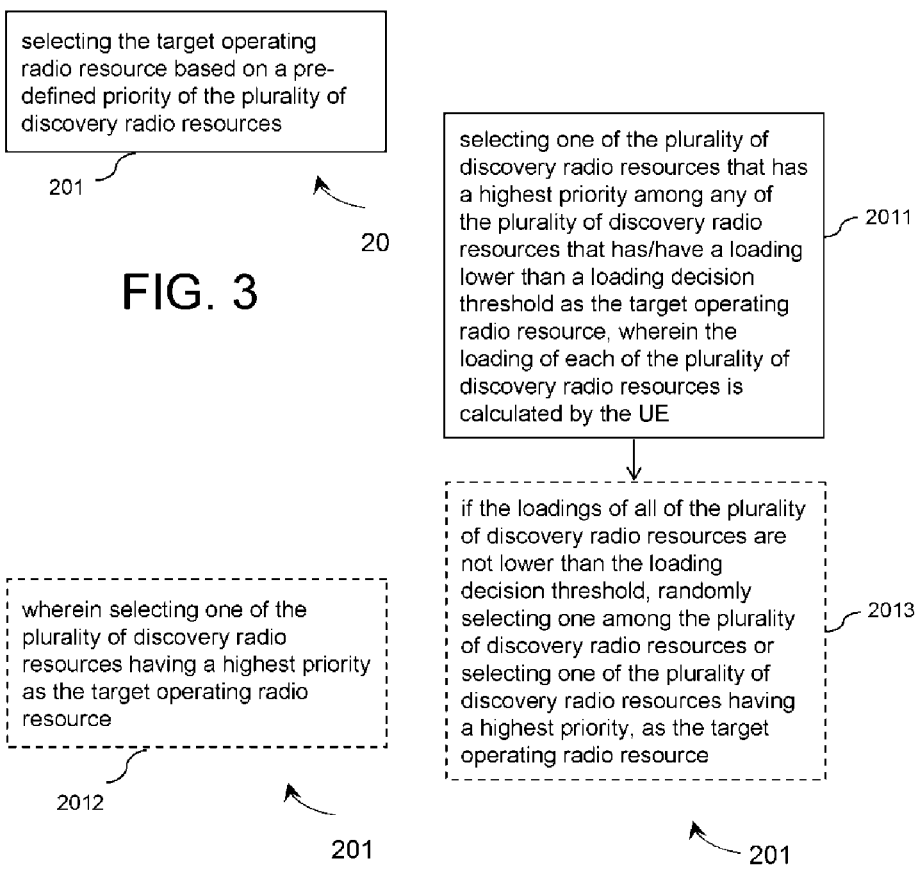

In an embodiment, the initial operating radio resource selecting process in step 20 of FIG. 2 may further include selecting the target operating radio resource based on a pre-defined priority of the plurality of discovery radio resources (see step 201 in FIG. 3).

In an embodiment, the step of selecting the target operating radio resource based on a pre-defined priority of the plurality of discovery radio resources as shown in step 201 of FIG. 3 further comprises: selecting one of the plurality of discovery radio resources having a highest priority as the target operating radio resource (step 2012 in FIG. 3A).

In another embodiment, the step of selecting the target operating radio resource based on a pre-defined priority of the plurality of discovery radio resources as shown in step 201 of FIG. 3 further comprises: selecting one of the plurality of discovery radio resources that has a highest priority among any of the plurality of discovery radio resources that has/have a loading lower than a loading decision threshold as the target operating radio resource, wherein the loading of each of the plurality of discovery radio resources is calculated by the UE (step 2011 in FIG. 3B).

In an embodiment, if the loadings of all of the plurality of discovery radio resources are not lower than the loading decision threshold, the UE may randomly select one among the plurality of discovery radio resources or select one of the plurality of discovery radio resources having a highest priority, as the target operating radio resource (step 2013 in FIG. 3B).

After the initialization stage, Tx DUE selects one of the discovery radio resources as an operating radio resource to transmit a discovery signal of the DUE. In the radio resource update stage, the DUE updates the target operating radio resource. In an embodiment, Tx DUE may reselect and re-camp to other discovery radio resource because of the variation of loading among different discovery radio resources during a pre-defined hysteresis monitor duration. In an embodiment, Tx DUE may repeat the hysteresis monitor duration to different discovery radio resource until it finds out an appropriate discovery radio resource which the loading is lower than the loading decision threshold during the hysteresis monitor duration. Exemplary embodiments are disclosed to show how to prevent lots of Tx DUEs reselecting camped discovery radio resource in a rush.

Figure 4:
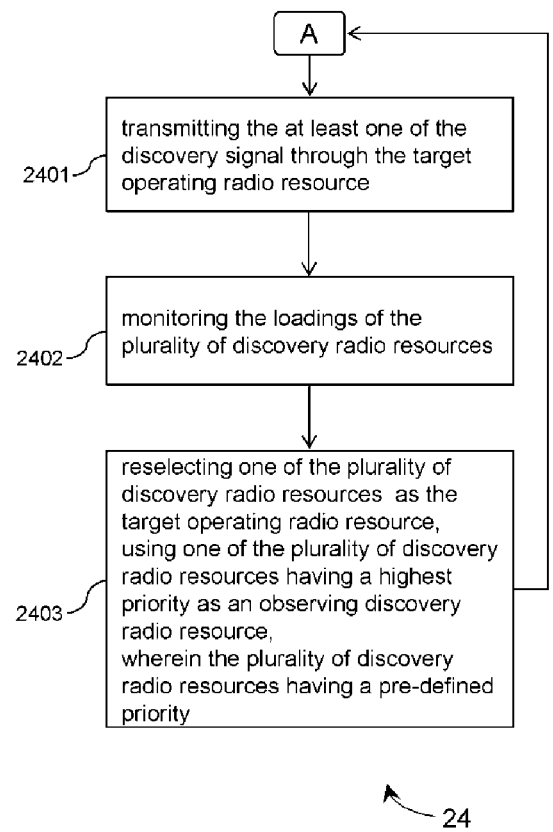
FIG. 4 shows an updating process described in FIG. 2 in accordance with an exemplary embodiment.

FIG. 4 shows an updating process described in step 24 of FIG. 2 in accordance with an exemplary embodiment. In an embodiment, the step updating the target operating radio resource by the UE based on a loading of the plurality of discovery radio resources calculating by the UE in step 24 of FIG. 2 further comprises transmitting, by the UE's transmitter(s), the at least one discovery signal through the target operating radio resource (step 2401), monitoring the loadings of the plurality of discovery radio resources (step 2402) and reselecting one of the plurality of discovery radio resources as the target operating radio resource, using one of the plurality of discovery radio resources having a highest priority as an observing discovery radio resource (step 2403), wherein the plurality of discovery radio resources having a pre-defined priority.

Furthermore, in some of the implementation of communication system, the process steps 2401~2403 may be restarted to transmit discovery signal(s), as shows in FIG. 4. Some exemplary embodiments of the reselecting process in step 2403 are shown in FIGS. 5, 6, 7, and 8. In these embodiments, the reselecting process may further include monitoring the loading of radio resources during a pre-defined hysteresis monitor duration.

Figure 5:
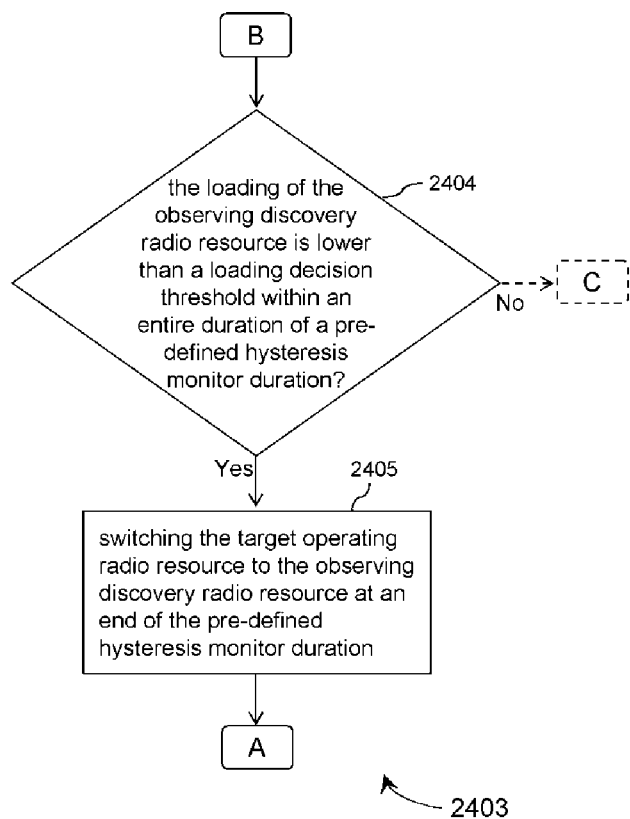
FIGS. 5, 6, 7, and 8 show several reselecting processes described in FIG. 4 in accordance with exemplary embodiments.

As shown in FIG. 5, the reselecting step in step 2403 further includes: if the loading of the observing discovery radio resource is lower than a loading decision threshold within the entire hysteresis monitor duration (step 2404), switching the target operating radio resource to the observing discovery radio resource at an end of the pre-defined hysteresis monitor duration (step 2405).

Figure 6:
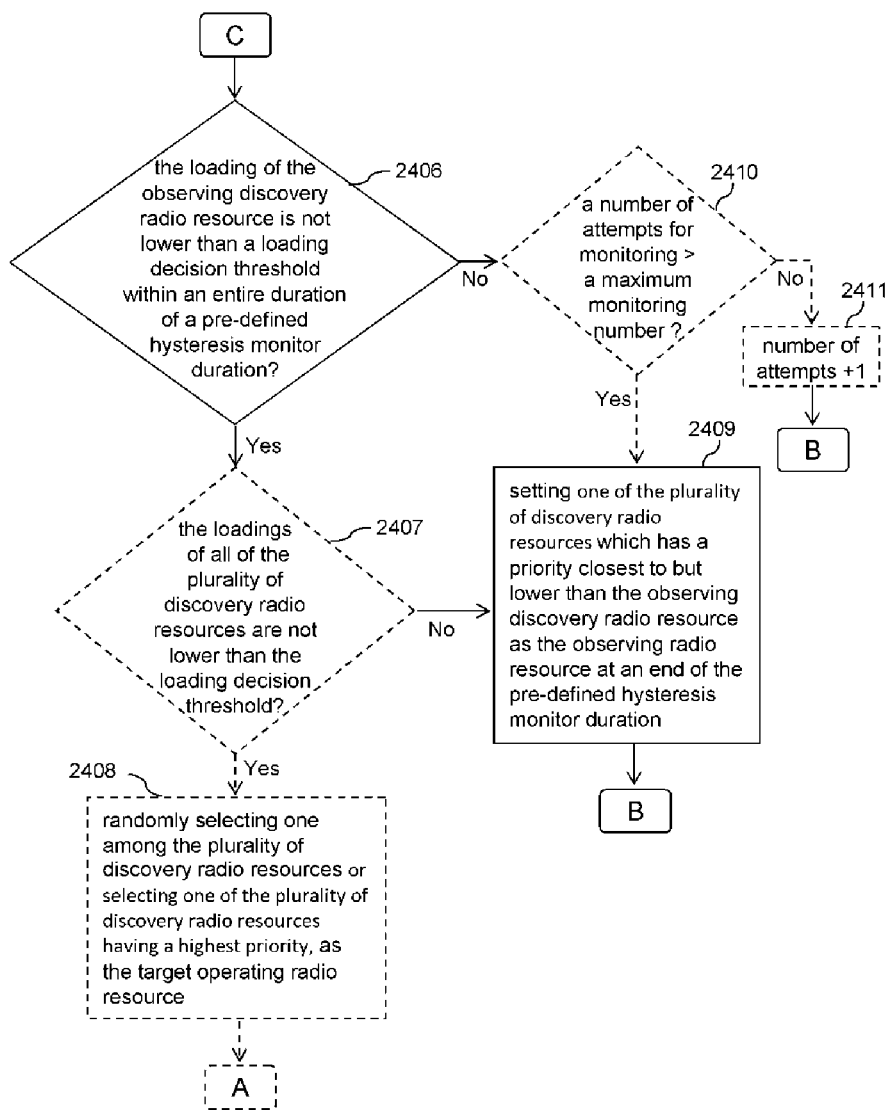

In an embodiment, if, however, the loading of the observing discovery radio resource is not lower than the loading decision threshold within the entire hysteresis monitor duration (step 2406 in FIG. 6), the UE sets one of the plurality of discovery radio resources which has a priority closest to but lower than the observing discovery radio resource as the observing discovery radio resource at an end of the pre-defined hysteresis monitor duration (step 2409 in FIG. 6).

In an embodiment, if, however, the loadings of all of the plurality of discovery radio resources are not lower than the loading decision threshold (step 2407), the UE randomly selects one among the plurality of discovery radio resources or the embodiment may select one of the plurality of discovery radio resources having a highest priority, as the target operating radio resource (step 2408 in FIG. 6).

In some of the implementation of communication system, once the loading of the observing discovery radio resource is lower than the loading decision threshold, the US may decide whether to perform the step 2409 based on whether the number of attempts for monitoring is greater than a maximum monitoring number (steps 2410, 2411 in FIG. 6). In some of the implementation of communication system, the US may restart the process steps 2404-2405 in FIG. 5.

Figure 7:
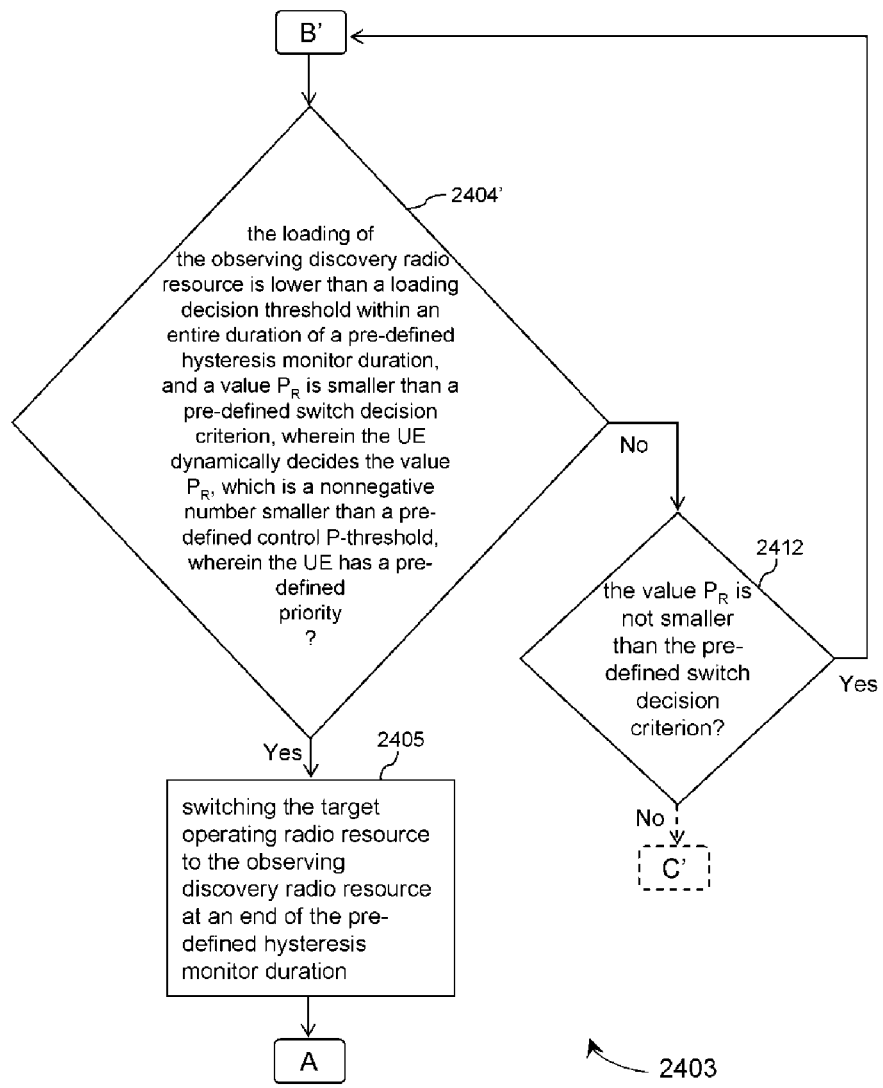

In an exemplary embodiment as shown in the process blocks of FIG. 7, the UE has a pre-defined priority, and the reselecting step shown in step 2403 of FIG. 4 further includes: switching the target operating radio resource to the observing discovery radio resource at an end of a pre-defined hysteresis monitor duration (step 2405 in FIG. 7), if the loading of the observing discovery radio resource is lower than a loading decision threshold within the entire hysteresis monitor duration and a value $P_R$ is smaller than a pre-defined switch decision criterion. The UE may dynamically decide the value $P_R$, which is a nonnegative number smaller than a pre-defined control P-threshold (step 2404' in FIG. 7). In an embodiment, the hysteresis monitor duration may be restarted if the value $P_R$ is not smaller than the pre-defined switch decision criterion (step 2412 in FIG. 7).

Figure 8:
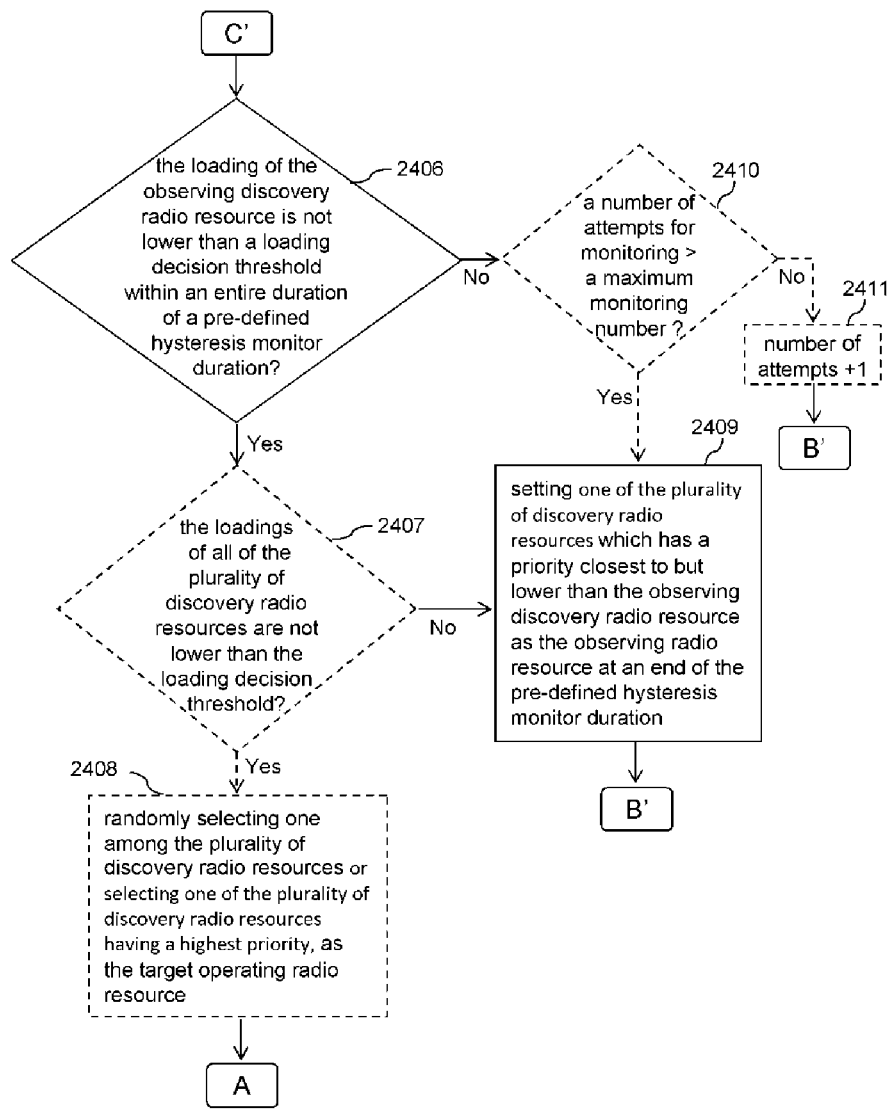

In an embodiment, if, however, if the loading of the observing discovery radio resource is not lower than a loading decision threshold within the entire hysteresis monitor duration and a value $P_R$ is smaller than a pre-defined switch decision criterion, the same process steps 2406, 2409, 2407, 2408 in FIG. 8 will be performed, which are similar to the process steps of FIG. 6 and will not described. Furthermore, in some of the implementation of communication system, the process steps of FIG. 7 may be restarted.

In the embodiments of considering the UE priority, the hysteresis monitor duration is defined according to a hysteresis decision threshold. As shown in FIG. 9, $H_{L\_H}$ or $H_{H\_L}$ is the hysteresis decision threshold to decide the hysteresis monitor duration, $R_{L\_H}$ or $R_{H\_L}$ is the control P-threshold to decide the range for a Tx DUE to decide the probability value $P_R$.

In an embodiment, a higher priority UE may have a higher value of the hysteresis decision threshold than a lower priority UE while switching from a higher priority discovery radio resource to a lower priority discovery radio resource, and the higher priority UE may have a lower value of the hysteresis decision threshold than the lower priority UE while switching from the lower priority discovery radio resource to the higher priority discovery radio resource.

In another embodiment, a higher priority UE may have a higher value of the control P-threshold than a lower priority UE while switching from a higher priority discovery radio resource to a lower priority discovery radio resource, and the higher priority UE may have a lower value of the control P-threshold than the lower priority UE while switching from the lower priority discovery radio resource to the higher priority discovery radio resource.

FIG. 9 shows exemplary embodiments S#1~S#3 of rules for configuring the hysteresis monitor duration threshold for different priority UE. In FIG. 9, $U_1$ is a high priority UE and $U_2$ is a low priority UE. $H_{L\_H}$ is the hysteresis decision threshold to decide the hysteresis monitor duration when a Tx DUE wants to switch from a low priority discovery radio resource to a high priority discovery radio resource. $H_{H\_L}$ is the hysteresis decision threshold to decide the hysteresis monitor duration when a Tx DUE wants to switch from a high priority discovery radio resource to a low priority discovery radio resource. $R_{L\_H}$ is the control P-threshold to decide the range for a Tx DUE to decide a Tx-Probability value $P_R$ when it wants to switch from a low priority discovery radio resource to a high priority discovery radio resource, $P_R$ may be configured $0 \leq P_R \leq R_{L\_H}$. $R_{H\_L}$ is the control P-threshold to decide the range for a Tx DUE to decide the probability value $P_R$ when it wants to switch from a high priority discovery radio resource to a low priority discovery radio resource, $P_R$ may be configured $0 \leq P_R \leq R_{H\_L}$.

In an exemplary embodiment, for example, Tx DUE may decide to broadcast discovery signal on the direct discovery radio resource provided by CC#1. Herein, the Tx DUE is called "camped" on CC#1 to deliver discovery signal. In embodiment S#1, $U_1$ may be easier than $U_2$ to get a shorter hysteresis monitor duration when it wants to switch to a higher priority CC. In addition, $U_1$ may be easier than $U_2$ to get a longer hysteresis monitor duration when it wants to switch to a lower priority CC. Therefore, it would be easier for $U_1$ to camp to the higher priority CC. In embodiment S#2, $U_1$ may be easier than $U_2$ to get a smaller value $P_R$ when it wants to switch to a higher priority CC. In addition, $U_1$ may be easier than $U_2$ to get a higher value $P_R$ when it wants to switch to a lower priority CC. Therefore, it would be easier for $U_1$ to camp to the higher priority CC. Embodiment S#3 is the combination of embodiment S#1 and embodiment S#2.

In some of the embodiments, the discovery radio resource prioritization, the loading decision threshold, the hysteresis monitor duration, the switch decision criterion, and/or the control P-threshold may be pre-configured (pre-defined) by MBS through a broadcasting/dedicated signaling or through a pre-stored list in the memory or USIM card in the DUE or provided by the backend server. DUEs may know the priority of each discovery radio resource based on the order of the discovery radio resources appearance in the message or list. In an embodiment, the priority of each discovery radio resource also could be implemented by a priority index of each of the discovery radio resource in the message or list. The priority of each discovery radio resource may be decided based on the amount of discovery radio resource pools in each frequency, decided based on the assignment from the backend server, or randomly decided.

In an embodiment the time span of hysteresis monitor duration may be randomly decided. Each Tx DUE may randomly decide the time span of hysteresis monitor duration, $T_H$, $0 < T_H < H$. H may be a pre-configured threshold to indicate the range for Tx DUE to decide $T_H$. Then, Tx DUE may switch to another discovery radio resource in the end of hysteresis monitor duration if the loading conditions are stable during the hysteresis monitor duration.

In an embodiment using a Tx-Probability decision in hysteresis monitor duration. The time span of hysteresis monitor duration may be fixed. If the triggering conditions of discovery radio resource reselection progress are stable during the hysteresis monitor duration, Tx DUE may randomly decide a value, which is called Tx-Probability value $P_R$, to help Tx DUE make the discovery radio resource switch decision. $P_R$ may be configured $0 \leq P_R \leq R$. R is a pre-configured control P-threshold to indicate the range for Tx DUE to decide $P_R$. Tx DUE would switch to the target discovery radio resource if $P_R < T_d$. $T_d$ may be a pre-configured switch decision criterion. In addition, Tx DUE may start the next hysteresis monitor duration if $P_R \geq T_d$. Tx DUE may randomly decide another $P_R$ and then make the next discovery radio resource switch decision in the end of next hysteresis monitor duration.

Figure 10:
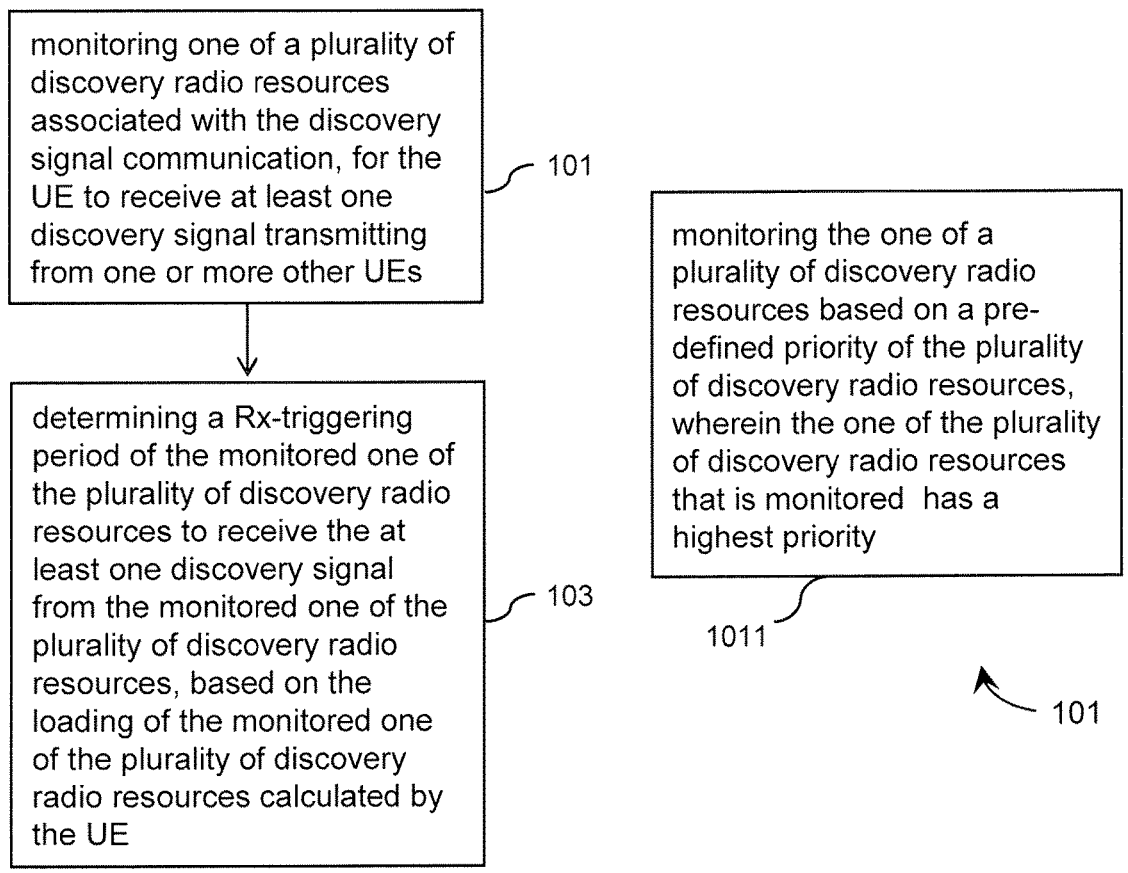
FIG. 10 shows a process of controlling discovery signal communication of a user equipment (UE) to receive discovery signal(s) in accordance with an exemplary embodiment.

A device may be a Tx DUE, an Rx DUE, or it may also play both of the roles. FIG. 10 discloses a method of controlling discovery signal communication of a user equipment (UE) to receive discovery signal(s) in accordance with an exemplary embodiment. As shown in FIG. 10, the UE monitors one of the plurality of discovery radio resources associated with the discovery signal communication, for the UE's receiver(s) to receive the at least one discovery signal transmitting from one or more other user equipments (step 101), and determines a Rx-triggering period of the monitored discovery radio resource to receive the at least one discovery signal from the monitored discovery radio resource, based on the loading of the monitored discovery radio resource calculating by the UE (step 103).

In an embodiment, the step of monitors one of the plurality of discovery radio resources associated with the discovery signal communication shown in step 101 of FIG. 10 further includes monitoring the one of the plurality of discovery radio resources based on a pre-defined priority of the plurality of discovery radio resources, wherein the one of the plurality of discovery radio resources that is monitored has a highest priority (step 1011 in FIG. 10). In some embodiments, the plurality of discovery radio resources are a plurality of component carriers (CCs) respectively on a plurality of frequencies, or a plurality of time-frequency radio resource pools of one of the plurality of CCs.

Figures 11A, 11B:
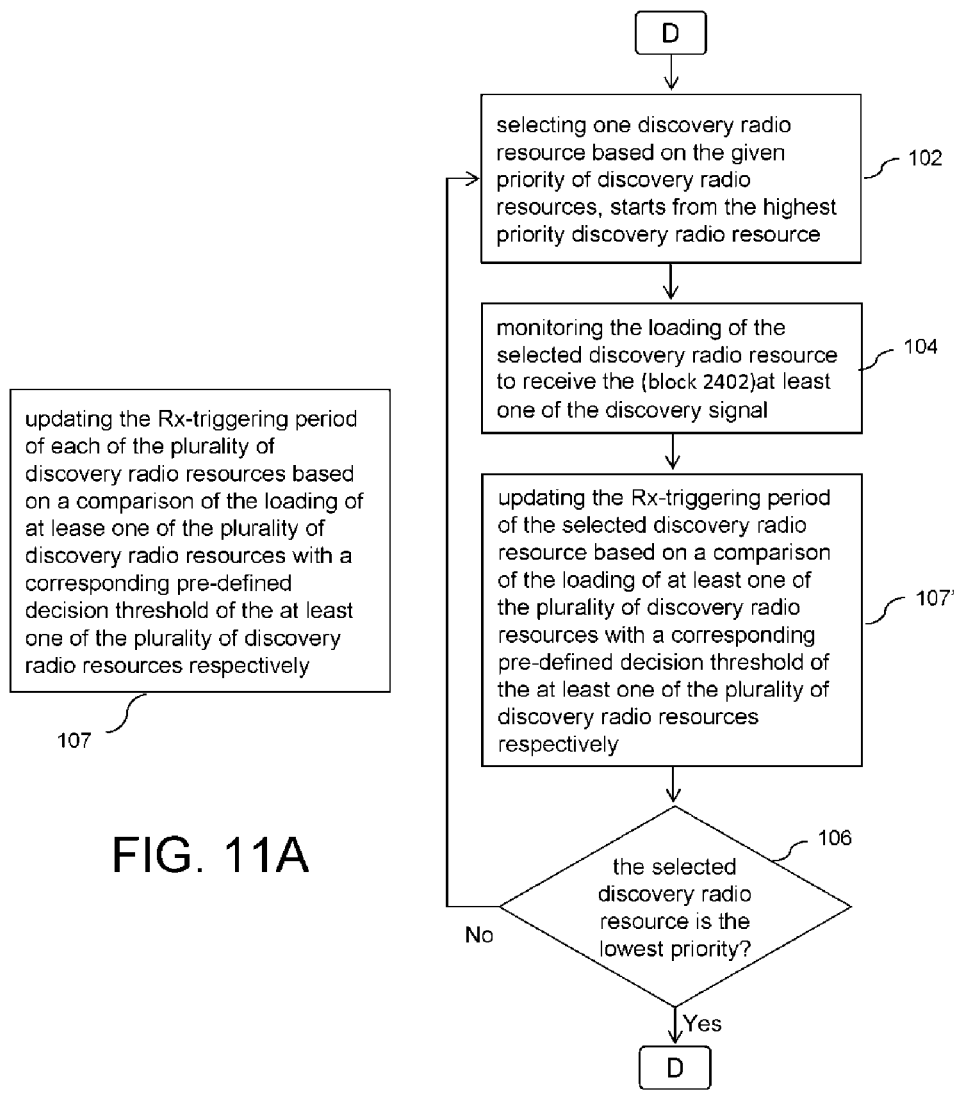
FIGS. 11A & 11B show several exemplary embodiments of a user equipment (UE) to receive discovery signal(s)

In an embodiment, the UE may further update the Rx-triggering period of each of the plurality of discovery radio resources based on a comparison of the loading of at least one of the plurality of discovery radio resources with a corresponding pre-defined decision threshold of the at least one of the plurality of discovery radio resources respectively (step 107 in FIG. 11A).

In some of the implementation of the communication system, an embodiment of Rx-triggering period updating process of block 107 of FIG. 11A is shown in the process blocks of FIG. 11B. In an embodiment one discovery radio resource is selected based on the given priority of discovery radio resources, starts from the highest priority discovery radio resource (block 102). The Rx-triggering period of the selected discovery radio resources is updated based on a comparison of the loading of at least one of the plurality of discovery radio resources with a corresponding pre-defined decision threshold of the at least one of the plurality of discovery radio resources respectively (block 107'). If the selected discovery radio resource is not the lowest priority, the UE keep selecting the discovery radio resource (block 102) and updating the $R_x$-triggering period of the selected discovery radio resource (block 107') until the selected discovery radio resource is the lowest priority (block 106).

Figure 12:
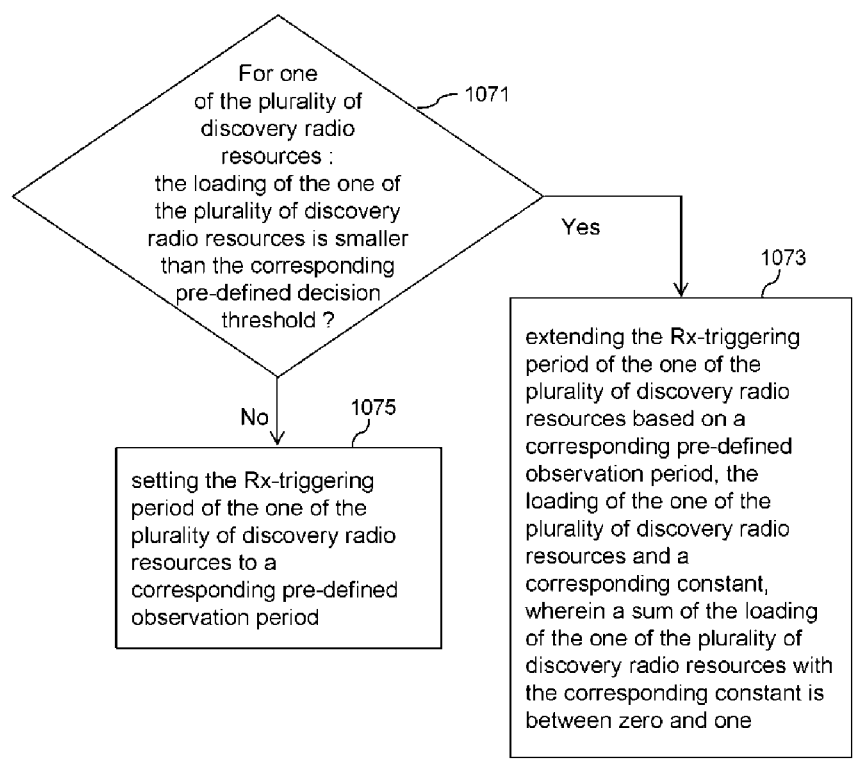
FIGS. 12-14 show several exemplary embodiments of the updating step in FIG. 11A.
Figure 13:
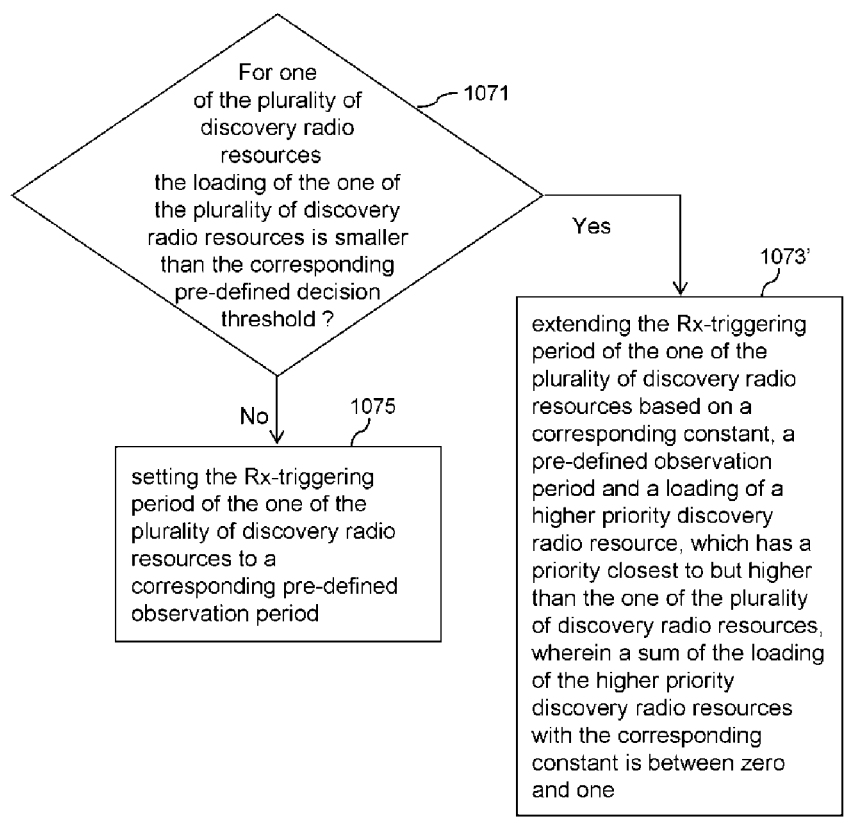
Figure 14:
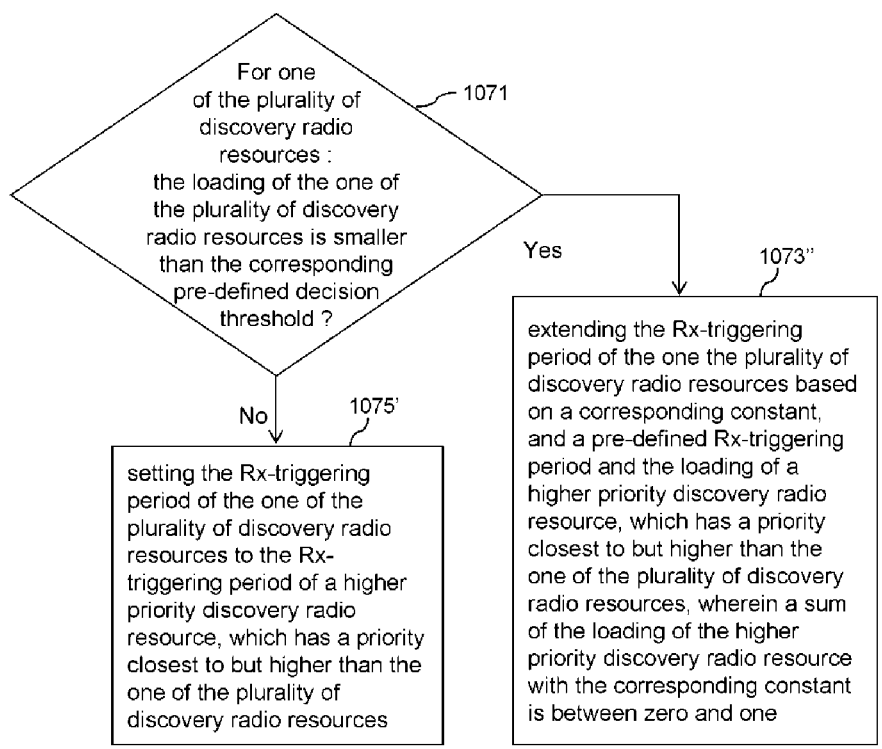

Some embodiments of the step 107 are shown in FIGS. 12, 13, and 14. In an embodiment as shown in the process of FIG. 12, for one of the plurality of discovery radio resources, if the loading of the one of the plurality of discovery radio resources is smaller than the corresponding pre-defined decision threshold (step 1071), the updating step 107 in FIG. 11A may further include extending the Rx-triggering period of the one of the plurality of discovery radio resources based on a corresponding pre-defined observation period, the loading of the one of the plurality of discovery radio resources, and a corresponding constant, wherein a sum of the loading of the one of the plurality of discovery radio resources with the corresponding constant is between zero and one (step 1073); otherwise, setting the Rx-triggering period of the one of the plurality of discovery radio resources to the corresponding pre-defined observation period (step 1075).

Refer to FIG. 12, in the embodiment the Rx-triggering period of a discovery radio resource is decided based on self-loading of the discovery radio resource. Taking three CCs as an example, after monitoring CC#1, if the loading $L_1$ is smaller than the corresponding decision threshold $L_T(CC\#1)$ the Rx-triggering period $T_1$ of CC#1 will be decided according to the loading $L_1$ of CC#1, a corresponding pre-defined observation period $T_D(CC\#1)$, and a corresponding constant $K_1$ of CC#1; otherwise the Rx-triggering period $T_1$ is set to the observation period $T_D(CC\#1)$ as expression (1). The same rule fits for CC#2, and CC#3.

$$\begin{cases} \text{If } L_1 < L_T(CC\#1) \Rightarrow T_1 = T_D(CC\#1)/(L_1 + K_1) \cdot 0 < L_1 + K_1 < 1 & (1) \\ \text{Otherwise, } T_1 = T_D(CC\#1) \end{cases}$$

In another embodiment as shows in the process of FIG. 13, for one of the plurality of discovery radio resources, if the loading of the one of the plurality of discovery radio resources is smaller than the corresponding pre-defined decision threshold (step 1071), the updating step 107 in FIG. 11A may further include extending the Rx-triggering period of the one of the plurality of discovery radio resources based on a corresponding constant, a pre-defined observation period and a loading of a higher priority discovery radio resource, which has a priority closest to but higher than the one of the plurality of discovery radio resources, wherein a sum of the loading of the higher priority discovery radio resource with the corresponding constant is between zero and one (step 1073'); otherwise, setting the Rx-triggering period of the one of the plurality of discovery radio resources to the corresponding pre-defined observation period (step 1075).

Refer to FIG. 13, in the embodiment the Rx-triggering period of a lower priority discovery radio resource is decided based on the loading of the discovery radio resource has a priority closest to but higher than the lower priority discovery radio resource. For example assuming the priority of CC#i is higher than CC#j, after monitor CC#j, if the loading $L_j$ is smaller than the corresponding decision threshold $L_T(CC\#j)$ the Rx-triggering period $T_j$ of CC#j will be decided according to the loading $L_i$ of CC#i, a corresponding pre-defined observation period $T_D(CC\#j)$, and a corresponding constant $K_j$ of CC#j; otherwise the Rx-triggering period $T_j$ is set to the observation period $T_D(CC\#j)$ as expression (2).

$$\begin{cases} \text{If } L_j < L_T(CC\#j) \Rightarrow T_j = T_D(CC\#j)/(L_i + K_j) \cdot 0 < L_i + K_j < 1 & (2) \\ \text{Otherwise, } T_j = T_D(CC\#j) \end{cases}$$

In another embodiment as shows in the process of FIG. 14, for one of the plurality of discovery radio resources, if the loading of the one of the plurality of discovery radio resources is smaller than the corresponding pre-defined decision threshold (step 1071), the updating step 107 in FIG. 11A may further include extending the Rx-triggering period of the one of the plurality of discovery radio resources based on a corresponding constant, and a pre-defined Rx-triggering period and the loading of a higher priority discovery radio resource, which has a priority closest to but higher than the one of the plurality of discovery radio resources, wherein a sum of the loading of the higher priority discovery radio resource with the corresponding constant is between zero and one (step 1073"); otherwise, setting the Rx-triggering period of the one of the plurality of discovery radio resources to the Rx-triggering period of a higher priority discovery radio resource, which has a priority closest to but higher than the one of the plurality of discovery radio resources (step 1075').

Refer to FIG. 14, in the embodiment the Rx-triggering period of a lower priority discovery radio resource is decided based on the loading of the discovery radio resource has a priority closest to but higher than the lower priority discovery radio resource. For example assuming the priority of CC#i is higher than CC#j, after monitor CC#j, if the loading $L_1$ is smaller than the corresponding decision threshold $L_T(CC\#j)$ the Rx-triggering period $T_j$ of CC#j will be decided according to the loading $L_i$ of CC#i, a pre-defined observation period $T_i$ of the higher priority discovery radio resource CC#i, and a corresponding constant $K_j$ of CC#j; otherwise the Rx-triggering period $T_j$ is set to the observation period $T_i$ as expression (3).

$$\begin{cases} \text{If } L_j < L_T(CC\#j) \Rightarrow T_j = T_i/(L_i + K_j) \cdot 0 < L_i + K_j < 1 & (3) \\ \text{Otherwise, } T_j = T_i \end{cases}$$

Figure 15:
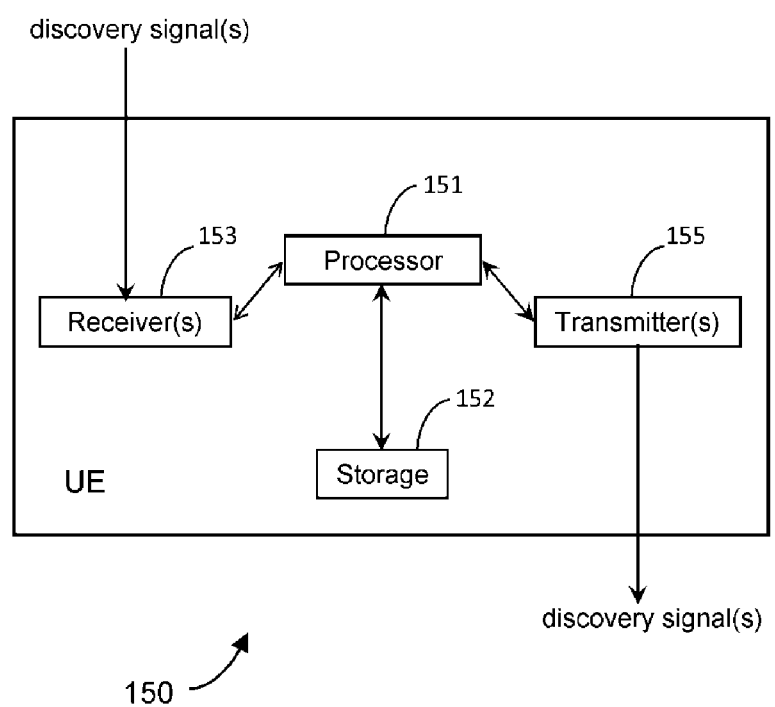
FIG. 15 shows a schematic diagram of a user equipment of controlling discovery signal communication in accordance with an exemplary embodiment.

FIG. 15 shows a schematic diagram of an exemplary embodiment of a user equipment (UE) 150 of controlling discovery signal communication. The UE includes a processor 151, one or more receivers 153, one or more transmitters 155, and a storage 152 operatively couple to the processor 151 to store operational data. The processor 151 is operatively coupled to the transmitter(s) 155 for the transmitter(s) 155 to transmit discovery signal(s) of the UE 150. The processor 151 is operatively coupled to the receiver(s) 153 for the receiver (s) 153 to receive discovery signal(s) transmitting from other UE(s). The processor 151, the transmitter(s) 155 and the receiver(s) 153 are configured to perform the above steps mentioned in all of the illustrated embodiments.

It is intended that the specification and examples be considered as exemplary only, with a true scope of the application being indicated by the following claims and their equivalents.

What is claimed is:

1. A method of controlling discovery signal communication of a user equipment (UE), comprising:
    selecting a target operating radio resource associated with the discovery signal communication among a plurality of discovery radio resources to transmit at least one discovery signal of the UE;
    updating the target operating radio resource by the UE based on a loading of the plurality of discovery radio resources calculated by the UE;
    monitoring one of the plurality of discovery radio resources associated with the discovery signal communication, for the UE to receive the at least one discovery signal transmitting from one or more other user equipments;
    determining a Rx-triggering period of the monitored discovery radio resource to receive the at least one discovery signal from the monitored discovery radio resource, based on the loading of the monitored discovery radio resource calculated by the UE; and
    updating the Rx-triggering period of each of the plurality of discovery radio resources based on a comparison of the loading of at least one of the plurality of discovery radio resources with a corresponding pre-defined decision threshold of the at least one of the plurality of discovery radio resources respectively,
    when the loading of the one of the plurality of discovery radio resources is smaller than the corresponding pre-defined decision threshold, extending the Rx-triggering period of the one of the plurality of discovery radio resources.

2. The method of claim 1, wherein the plurality of discovery radio resources are a plurality of component carriers (CCs) respectively on a plurality of frequencies, or a plurality of time-frequency radio resource pools of one of the plurality of CCs.

3. The method of claim 1, wherein the selecting step further comprises:
    selecting the target operating radio resource based on a pre-defined priority of the plurality of discovery radio resources.

4. The method of claim 3, wherein the selecting step further comprises:
    selecting one of the plurality of discovery radio resources having a highest priority as the target operating radio resource.

5. The method of claim 3, wherein the selecting step further comprises:
    selecting one of the plurality of discovery radio resources that has a highest priority among any of the plurality of discovery radio resources that has/have a loading lower than a loading decision threshold as the target operating radio resource,
    wherein the loading of each of the plurality of discovery radio resources is calculated by the UE.

6. The method of claim 5, wherein the selecting step further comprises:
    when the loadings of all of the plurality of discovery radio resources are not lower than the loading decision threshold, randomly selecting one among the plurality of discovery radio resources or selecting one of the plurality of discovery radio resources having a highest priority, as the target operating radio resource.

7. The method of claim 1, wherein the plurality of discovery radio resources having a pre-defined priority, wherein the updating step further comprises:
    transmitting the at least one discovery signal through the target operating radio resource;
    monitoring the loadings of the plurality of discovery radio resources; and
    reselecting one of the plurality of discovery radio resources as the target operating radio resource, using one of the plurality of discovery radio resources having a highest priority as an observing discovery radio resource.

8. The method of claim 7, wherein the reselecting step further comprises:
    switching the target operating radio resource to the observing discovery radio resource at an end of a pre-defined hysteresis monitor duration, when the loading of the observing discovery radio resource is lower than a loading decision threshold within the entire hysteresis monitor duration.

9. The method of claim 8, wherein the reselecting step further comprises:
    when the loading of the observing discovery radio resource is not lower than the loading decision threshold within the entire hysteresis monitor duration, setting one of the plurality of discovery radio resources which has a priority closest to but lower than the observing discovery radio resource as the observing discovery radio resource at an end of the pre-defined hysteresis monitor duration.

10. The method of claim 9, wherein the reselecting step further comprises:
    when the loadings of all of the plurality of discovery radio resources are not lower than the loading decision threshold, randomly selecting one among the plurality of discovery radio resources or selecting one of the plurality of discovery radio resources having a highest priority, as the target operating radio resource.

11. The method of claim 3, wherein the updating step further comprises:
    transmitting the at least one discovery signal through the target operating radio resource;
    monitoring the loadings of the plurality of discovery radio resources; and
    reselecting one of the plurality of discovery radio resources as the target operating radio resource, using one of the plurality of discovery radio resources having a highest priority as an observing discovery radio resource.

12. The method of claim 7, wherein the UE has a pre-defined priority and wherein the reselecting step further comprises:
    switching the target operating radio resource to the observing discovery radio resource at an end of a pre-defined hysteresis monitor duration, when the loading of the observing discovery radio resource is lower than a loading decision threshold within the entire hysteresis monitor duration and a value $P_R$ is smaller than a pre-defined switch decision criterion,
    wherein the UE dynamically decides the value $P_R$, which is a nonnegative number smaller than a pre-defined control P-threshold.

13. The method of claim 12, wherein the UE restarts the hysteresis monitor duration when the value $P_R$ is not smaller than the pre-defined switch decision criterion.

14. The method of claim 12, wherein the hysteresis monitor duration is defined according to a hysteresis decision threshold, and a higher priority UE has a higher value of the hysteresis decision threshold than a lower priority UE while switching from a higher priority discovery radio resource to a lower priority discovery radio resource, the higher priority UE has a lower value of the hysteresis decision threshold than the lower priority UE while switching from the lower priority discovery radio resource to the higher priority discovery radio resource.

15. The method of claim 12, wherein a higher priority UE has a higher value of the control P-threshold than a lower priority UE while switching from a higher priority discovery radio resource to a lower priority discovery radio resource, and the higher priority UE has a lower value of the control P-threshold than the lower priority UE while switching from the lower priority discovery radio resource to the higher priority discovery radio resource.

16. The method of claim 14, wherein the higher priority UE has a higher value of the control P-threshold than the lower priority UE while switching from the higher priority discovery radio resource to the lower priority discovery radio resource, and the higher priority UE has a lower value of the control P-threshold than the lower priority UE while switching from the lower priority discovery radio resource to the higher priority discovery radio resource.

17. The method of claim 1, wherein the monitoring step further comprising:
monitoring the one of the plurality of discovery radio resources based on a pre-defined priority of the plurality of discovery radio resources,
wherein the one of the plurality of discovery radio resources that is monitored has a highest priority.

18. The method of claim 1, wherein for one of the plurality of discovery radio resources, the updating step further comprising:
when the loading of the one of the plurality of discovery radio resources is smaller than the corresponding pre-defined decision threshold, extending the Rx-triggering period of the one of the plurality of discovery radio resources based on a corresponding pre-defined observation period, the loading of the one of the plurality of discovery radio resources, and a corresponding constant,
wherein a sum of the loading of the one of the plurality of discovery radio resources with the corresponding constant is between zero and one,
otherwise, setting the Rx-triggering period of the one of the plurality of discovery radio resources to the corresponding pre-defined observation period.

19. The method of claim 1, wherein for one of the plurality of discovery radio resources, the updating step further comprising:
when the loading of the one of the plurality of discovery radio resources is smaller than the corresponding pre-defined decision threshold, extending the Rx-triggering period of the one of the plurality of discovery radio resources based on a corresponding constant, a corresponding pre-defined observation period, and a loading of a higher priority discovery radio resource, which has a priority closest to but higher than the one of the plurality of discovery radio resources,
wherein a sum of the loading of the higher priority discovery radio resource with the corresponding constant is between zero and one,
otherwise, setting the Rx-triggering period of the one of the plurality of discovery radio resources to the corresponding pre-defined observation period.

20. The method of claim 1, wherein for one of the plurality of discovery radio resources, the updating step further comprising:
when the loading of the one of the plurality of discovery radio resources is smaller than the corresponding pre-defined decision threshold, extending the Rx-triggering period of the one of the plurality of discovery radio resources based on a corresponding constant, and a pre-defined Rx-triggering period and the loading of a higher priority discovery radio resource, which has a priority closest to but higher than the one of the plurality of discovery radio resources,
wherein a sum of the loading of the higher priority discovery radio resource with the corresponding constant is between zero and one,
otherwise, setting the Rx-triggering period of the one of the plurality of discovery radio resources to the Rx-triggering period of the higher priority discovery radio resource, which has the priority closest to but higher than the one of the plurality of discovery radio resources.

21. A user equipment (UE) of controlling discovery signal communication, comprising:
a processor, operatively coupled to a transmitter, is configured to
select a target operating radio resource associated with the discovery signal communication among a plurality of discovery radio resources to transmit by the transmitter at least one discovery signal of the UE; and
update the target operating radio resource based on a loading of the plurality of discovery radio resources calculated by the processor,
wherein the processor, operatively coupled to a receiver, is configured to
monitor one of the plurality of discovery radio resources associated with the discovery signal communication, for the receiver to receive the at least one discovery signal transmitting from one or more other user equipments;
determine a Rx-triggering period of the monitored discovery radio resource to receive the at least one discovery signal from the monitored discovery radio resource, based on the loading of the monitored discovery radio resource calculated by the processor; and
update the Rx-triggering period of each of the plurality of discovery radio resources based on a comparison of the loading of at least one of the plurality of discovery radio resources with a corresponding pre-defined decision threshold of the at least one of the plurality of discovery radio resources respectively,
when the loading of the one of the plurality of discovery radio resources is smaller than the corresponding pre-defined decision threshold, the processor is configured to extend the Rx-triggering period of the one of the plurality of discovery radio resources.

22. The UE of claim 21, wherein the plurality of discovery radio resources are a plurality of component carriers (CCs) respectively on a plurality of frequencies, or a plurality of time-frequency radio resource pools of one of the plurality of CCs.

23. The UE of claim 21, wherein the processor is further configured to select the target operating radio resource based on a pre-defined priority of the plurality of discovery radio resources.

24. The UE of claim 23, wherein the processor is further configured to select one of the plurality of discovery radio resources having a highest priority as the target operating radio resource.

25. The UE of claim 23, wherein the processor is further configured to:
  select one of the plurality of discovery radio resources that has a highest priority among any of the plurality of discovery radio resources that has/have a loading lower than a loading decision threshold as the target operating radio resource,
  wherein the loading of each of the plurality of discovery radio resources is calculated by the processor.

26. The UE of claim 25, wherein when the loadings of all of the plurality of discovery radio resources are not lower than the loading decision threshold, the processor is configured to randomly select one among the plurality of discovery radio resources or is configured to select one of the plurality of discovery radio resources having a highest priority, as the target operating radio resource.

27. The UE of claim 21, wherein the plurality of discovery radio resources having a pre-defined priority, wherein
  the transmitter is configured to transmit the at least one discovery signal through the target operating radio resource; and
  the processor is further configured to,
    monitor the loading of the plurality of discovery radio resources; and
    reselect one of the plurality of discovery radio resources as the target operating radio resource, using one of the plurality of discovery radio resources having a highest priority as an observing discovery radio resource.

28. The UE of claim 27, wherein the processor is further configured to:
  switch the target operating radio resource to the observing discovery radio resource at an end of a pre-defined hysteresis monitor duration, when the loading of the observing discovery radio resource is lower than a loading decision threshold within the entire hysteresis monitor duration.

29. The UE of claim 28, wherein the processor is further configured to:
  set one of the plurality of discovery radio resources which has a priority closest to but lower than the observing discovery radio resource as the observing discovery radio resource at the end of a pre-defined hysteresis monitor duration, when the loading of the observing discovery radio resource is not lower than the loading decision threshold within the entire hysteresis monitor duration.

30. The UE of claim 29, wherein when the loadings of all of the plurality of discovery radio resources are not lower than the loading decision threshold, the processor is configured to randomly select one among the plurality of discovery radio resources or is configured to select one of the plurality of discovery radio resources having a highest priority, as the target operating radio resource.

31. The UE of claim 23, wherein
  the transmitter is further configured to transmit the at least one discovery signal through the target operating radio resource; and
  the processor is further configured to,
    monitor the loadings of the plurality of discovery radio resources; and
    reselect one of the plurality of discovery radio resources as the target operating radio resource, using one of the plurality of discovery radio resources having a highest priority as an observing discovery radio resource.

32. The UE of claim 27, wherein the UE has a pre-defined priority and wherein the processor is further configured to:
  switch the target operating radio resource to the observing discovery radio resource at an end of a pre-defined hysteresis monitor duration, when the loading of the observing discovery radio resource is lower than a loading decision threshold within the entire hysteresis monitor duration and a value $P_R$ is smaller than a pre-defined switch decision criterion,
  wherein the processor dynamically decides the value $P_R$, which is a nonnegative number smaller than a pre-defined control P-threshold.

33. The UE of claim 32, wherein the processor is configured to restart the hysteresis monitor duration when the value $P_R$ is not smaller than a pre-defined switch decision criterion.

34. The UE of claim 32, wherein the hysteresis monitor duration is defined according to a hysteresis decision threshold, and a higher priority UE has a higher value of the hysteresis decision threshold than a lower priority UE while switching from a higher priority discovery radio resource to a lower priority discovery radio resource, the higher priority UE has a lower value of the hysteresis decision threshold than the lower priority UE while switching from the lower priority discovery radio resource to the higher priority discovery radio resource.

35. The UE of claim 32, wherein a higher priority UE has a higher value of the control P-threshold than a lower priority UE while switching from a higher priority discovery radio resource to a lower priority discovery radio resource, and the higher priority UE has a lower value of the control P-threshold than the lower priority UE while switching from the lower priority discovery radio resource to the higher priority discovery radio resource.

36. The UE of claim 34, wherein the higher priority UE has a higher value of the control P-threshold than the lower priority UE while switching from the higher priority discovery radio resource to the lower priority discovery radio resource, and the higher priority UE has a lower value of the control P-threshold than the lower priority UE while switching from the lower priority discovery radio resource to the higher priority discovery radio resource.

37. The UE of claim 21, wherein the processor is further configured to:
  monitor the one of the plurality of discovery radio resources based on a pre-defined priority of the plurality of discovery radio resources,
  wherein the one of the plurality of discovery radio resources that is monitored has a highest priority.

38. The UE of claim 21, wherein for one of the plurality of discovery radio resources:
  when the loading of the one of the plurality of discovery radio resources is smaller than the corresponding pre-defined decision threshold, the processor is configured to extend the Rx-triggering period of the one of the plurality of discovery radio resources based on a corresponding pre-defined observation period, the loading of the one of the plurality of discovery radio resources, and a corresponding constant,
  wherein a sum of the loading of the one of the plurality of discovery radio resources with the corresponding constant is between zero and one,
  otherwise, setting the Rx-triggering period of the one of the plurality of discovery radio resources to the corresponding pre-defined observation period.

39. The UE of claim 21, wherein for one of the plurality of discovery radio resources:

when the loading of the one of the plurality of discovery radio resources is smaller than the corresponding pre-defined decision threshold, the processor is configured to extend the Rx-triggering period of the one of the plurality of discovery radio resources based on a corresponding constant, a corresponding pre-defined observation period, and a loading of a higher priority discovery radio resource, which has a priority closest to but higher than the one of the plurality of discovery radio resources,
wherein a sum of the loading of the higher priority discovery radio resource with the corresponding constant is between zero and one,
otherwise, the processor is configured to set the Rx-triggering period of the one of the plurality of discovery radio resources to the corresponding pre-defined observation period.

40. The UE of claim 21, wherein for one of the plurality of discovery radio resources:
when the loading of the one of the plurality of discovery radio resources is smaller than the corresponding pre-defined decision threshold, the processor is configured to extend the Rx-triggering period of the one of the plurality of discovery radio resources based on a corresponding constant, and a pre-defined Rx-triggering period and the loading of a higher priority discovery radio resource, which has a priority closest to but higher than the one of the plurality of discovery radio resources,
wherein a sum of the loading of the higher priority discovery radio resource with the corresponding constant is between zero and one,
otherwise, the processor is configured to set the Rx-triggering period of the one of the plurality of discovery radio resources to the Rx-triggering period of the higher priority discovery radio resource, which has the priority closest to but higher than the one of the plurality of discovery radio resources.

41. A method of controlling discovery signal communication of a user equipment (UE), comprising:
monitoring one of a plurality of discovery radio resources associated with the discovery signal communication, for the UE to receive at least one discovery signal transmitting from one or more other user equipments;
determining a Rx-triggering period of the monitored discovery radio resource to receive the at least one discovery signal from the monitored discovery radio resource, based on a loading of the monitored discovery radio resource calculated by the UE; and
updating the Rx-triggering period of each of the plurality of discovery radio resources based on a comparison of the loading of at least one of the plurality of discovery radio resources with a corresponding pre-defined decision threshold of the at least one of the plurality of discovery radio resources respectively,
when the loading of the one of the plurality of discovery radio resources is smaller than the corresponding pre-defined decision threshold, extending the Rx-triggering period of the one of the plurality of discovery radio resources.

42. The method of claim 41, wherein the monitoring step further comprising:
monitoring the one of the plurality of discovery radio resources based on a pre-defined priority of the plurality of discovery radio resources,
wherein the one of the plurality of discovery radio resources that is monitored has a highest priority.

43. The method of claim 41, wherein for one of the plurality of discovery radio resources the updating step further comprising:
when the loading of the one of the plurality of discovery radio resources is smaller than the corresponding pre-defined decision threshold, extending the Rx-triggering period of the one of the plurality of discovery radio resources based on a corresponding pre-defined observation period, the loading of the one of the plurality of discovery radio resources, and a corresponding constant,
wherein a sum of the loading of the one of the plurality of discovery radio resources with the corresponding constant is between zero and one,
otherwise, setting the Rx-triggering period of the one of the plurality of discovery radio resources to the corresponding pre-defined observation period.

44. The method of claim 41, wherein for one of the plurality of discovery radio resources the updating step further comprising:
when the loading of the one of the plurality of discovery radio resources is smaller than the corresponding pre-defined decision threshold, extending the Rx-triggering period of the one of the plurality of discovery radio resources based on a corresponding constant, a corresponding pre-defined observation period, and a loading of a higher priority discovery radio resource, which has a priority closest to but higher than the one of the plurality of discovery radio resources,
wherein a sum of the loading of the higher priority discovery radio resource with the corresponding constant is between zero and one,
otherwise, setting the Rx-triggering period of the one of the plurality of discovery radio resources to the corresponding pre-defined observation period.

45. The method of claim 41, wherein for one of the plurality of discovery radio resources the updating step further comprising:
when the loading of the one of the plurality of discovery radio resources is smaller than the corresponding pre-defined decision threshold, extending the Rx-triggering period of the one of the plurality of discovery radio resources based on a corresponding constant, and a pre-defined Rx-triggering period and the loading of a higher priority discovery radio resource, which has a priority closest to but higher than the one of the plurality of discovery radio resources,
wherein a sum of the loading of the higher priority discovery radio resource with the corresponding constant is between zero and one,
otherwise, setting the Rx-triggering period of the one of the plurality of discovery radio resources to the Rx-triggering period of the higher priority discovery radio resource, which has the priority closest to but higher than the one of the plurality of discovery radio resources.

46. The method of claim 41, wherein the plurality of discovery radio resources are a plurality of component carriers (CCs) respectively on a plurality of frequencies, or a plurality of time-frequency radio resource pools of one of the plurality of CCs.

47. A user equipment (UE) of controlling discovery signal communication, comprising:
a processor, operatively coupled to a receiver, configured to
monitor one of a plurality of discovery radio resources associated with the discovery signal communication, for the receiver to receive at least one discovery signal transmitting from one or more other user equipments;

determine a Rx-triggering period of the monitored discovery radio resource to receive the at least one discovery signal from the monitored discovery radio resource, based on a loading of the monitored discovery radio resource calculated by the processor; and update the Rx-triggering period of each of the plurality of discovery radio resources based on a comparison of the loading of at least one of the plurality of discovery radio resources with a corresponding pre-defined decision threshold of the at least one of the plurality of discovery radio resources respectively, when the loading of the one of the plurality of discovery radio resources is smaller than the corresponding pre-defined decision threshold, the processor is configured to extend the Rx-triggering period of the one of the plurality of discovery radio resources.

48. The UE of claim 43, wherein the processor is further configured to:

monitor the one of the plurality of discovery radio resources based on a pre-defined priority of the plurality of discovery radio resources, wherein the one of the plurality of discovery radio resources that is monitored has a highest priority.

49. The UE of claim 47, wherein for one of the plurality of discovery radio resources:

when the loading of the one of the plurality of discovery radio resources is smaller than the corresponding pre-defined decision threshold, the processor is configured to extend the Rx-triggering period of the one of the plurality of discovery radio resources based on a corresponding pre-defined observation period, the loading of the one of the plurality of discovery radio resources, and a corresponding constant, wherein a sum of the loading of the one of the plurality of discovery radio resources with the corresponding constant is between zero and one, otherwise, setting the Rx-triggering period of the one of the plurality of discovery radio resources to the corresponding pre-defined observation period.

50. The UE of claim 47, wherein for one of the plurality of discovery radio resources:

when the loading of the one of the plurality of discovery radio resources is smaller than the corresponding pre-defined decision threshold, the processor is configured to extend the Rx-triggering period of the one of the plurality of discovery radio resources based on a corresponding constant, a corresponding pre-defined observation period, and a loading of a higher priority discovery radio resource, which has a priority closest to but higher than the one of the plurality of discovery radio resources, wherein a sum of the loading of the higher priority discovery radio resource with the corresponding constant is between zero and one, otherwise, the processor is configured to set the Rx-triggering period of the one of the plurality of discovery radio resources to the corresponding pre-defined observation period.

51. The UE of claim 47, wherein for one of the plurality of discovery radio resources:

when the loading of the one of the plurality of discovery radio resources is smaller than the corresponding pre-defined decision threshold, the processor is configured to extend the Rx-triggering period of the one of the plurality of discovery radio resources based on a corresponding constant, and a pre-defined Rx-triggering period and the loading of a higher priority discovery radio resource, which has a priority closest to but higher than the one of the plurality of discovery radio resources, wherein a sum of the loading of the higher priority discovery radio resource with the corresponding constant is between zero and one, otherwise, the processor is configured to set the Rx-triggering period of the one of the plurality of discovery radio resources to the Rx-triggering period of the higher priority discovery radio resource, which has the priority closest to but higher than the one of the plurality of discovery radio resources.

52. The UE of claim 47, wherein the plurality of discovery radio resources are a plurality of component carriers (CCs) respectively on a plurality of frequencies, or a plurality of time-frequency radio resource pools of one of the plurality of CCs.

* * * * *